United States Patent Office 3,723,345
Patented Mar. 27, 1973

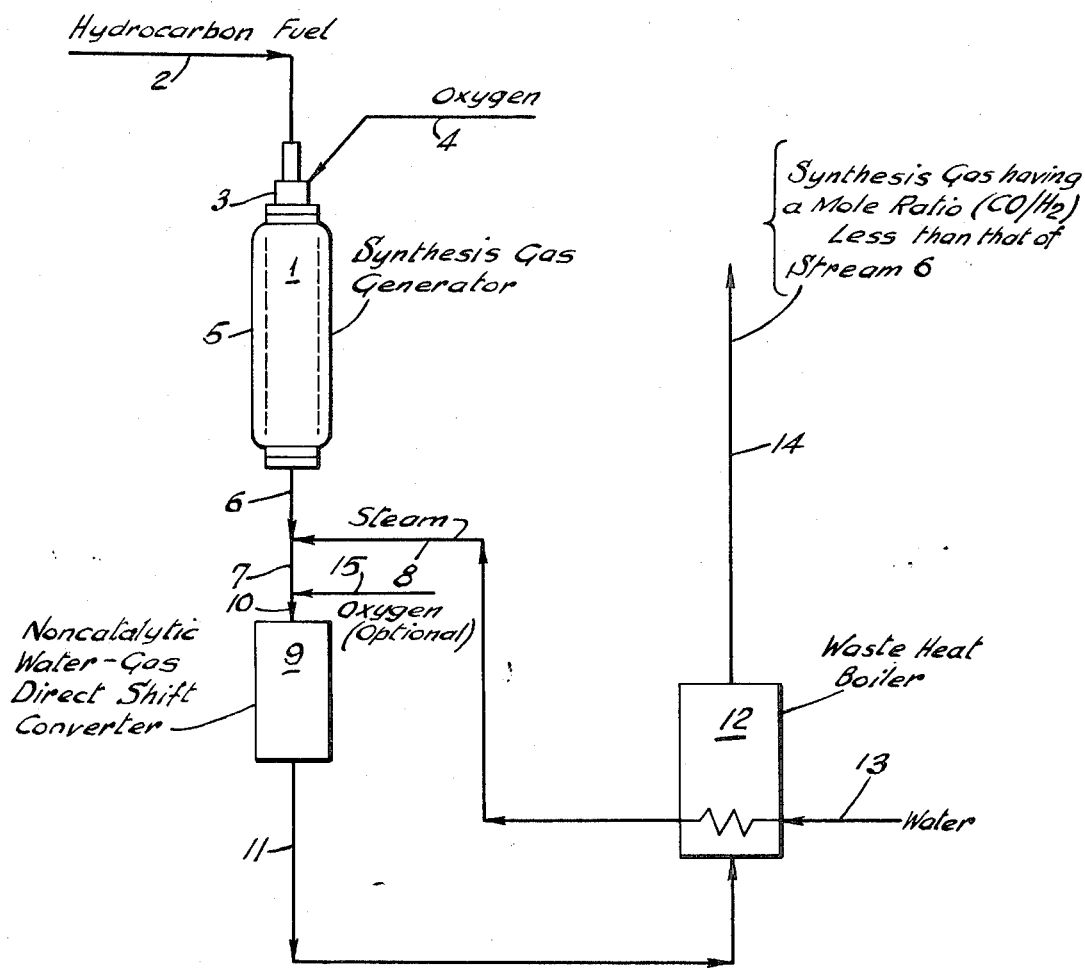

3,723,345
SYNTHESIS GAS PROCESS
Blake Reynolds, Riverside, Conn., assignor to Texaco Development Corporation, New York, N.Y.
Filed Nov. 21, 1969, Ser. No. 878,728
Int. Cl. C07c 1/02
U.S. Cl. 252—373
9 Claims

ABSTRACT OF THE DISCLOSURE

Synthesis gas, i.e., a mixture of carbon monoxide and hydrogen is produced by direct partial oxidation of a hydrocarbon fuel with oxygen followed by non-catalytic reaction with steam at a temperature of at least 1500° F. and preferably in the range of about 1700 to 2800° F. in one or more reaction zones.

BACKGROUND OF THE INVENTION

Field of the invention

This invention relates to a method for the production of synthesis gas, i.e., a mixture of carbon monoxide and hydrogen, and is particularly useful for the production of methanol synthesis gas and Fischer-Tropsch synthesis gas from hydrocarbons.

Description of the prior art

Hydrogen and carbon monoxide for synthesis gas are commonly made by partial oxidation of hydrocarbon fuels with oxygen at autogenous reaction temperatures. Such mixtures are useful as a source of feed gas for the synthesis of ammonia, hydrocarbons, and oxygen-containing organic compounds.

The mole ratio of $CO/H_2$ in synthesis gas mixtures made by partial oxidation of hydrocarbon with oxygen in a synthesis gas generator is primarily a function of the C/H ratio in the fuel. The introduction of steam, carbon dioxide or both as moderators in the reaction also has some effect on the $CO/H_2$ ratio of the synthesis gas so produced. Only limited amounts of such modeators may be supplied directly to the reaction zone of a synthesis gas generator without excessive reduction of the autogenous reaction temperature or production of unwanted by-products, such as methane. Typically the product gas obtained by direct partial oxidation of liquid hydrocarbons contains approximately equal volumes of carbon monoxide and hydrogen. It is customary to increase the relative proportions of hydrogen to carbon monoxide by a catalytic water-gas shift reaction.

The catalytic water-gas shift reaction by which carbon monoxide is reacted with steam over a catalyst at a temperature in the range of about 400 to 1000° F., to produce hydrogen and carbon dioxide is well known. An iron-chrome oxide catalyst is commonly used at the higher temperatures while a zinc-oxide copper-oxide catalyst may be used at the lower temperatures.

SUMMARY

In an example of the present invention, methanol synthesis gas having a mole ratio $CO/H_2$ of about 0.5 or lower is made by mixing steam preferably at a temperature in the range of about 500 to 1500° F. with hot effluent gas from a synthesis gas generation zone comprising CO and $H_2$ at a temperature in the range of 2000 to 3000° F. in a non-catalytic adiabatic free-flow water-gas shift conversion zone at a temperature in the range of at least 1500° F. and preferably in the range of about 1700 to 2800° F., wherein a portion of the steam in the water-gas shift feed gas mixture is reduced to hydrogen by a portion of the carbon monoxide in the shift feed gas mixture which is simultaneously oxidized to carbon dioxide. In a preferred embodiment of the invention, said effluent gas from a synthesis gas generator is fed to the non-catalytic shift converter at substantially the conditions of temperature and pressure produced by the partial oxidation of a hydrocarbon fuel in a free-flow synthesis gas generator. The pressure may be within the range of 1 to 350 atmospheres; pressures of 40 to 200 atmospheres are preferred.

It is therefore a principal object of the present invention to provide a novel, continuous, two-stage process for the production of synthesis gas.

Another object is to provide a non-catalytic process for making synthesis gas, which process may be independent of externally supplied heat.

These and other objects and advantages of the invention will be apparent from the following disclosure and from the drawing showing one embodiment of the invention.

DESCRIPTION OF THE INVENTION

Synthesis gas, principally comprising a mixture of carbon monoxide and hydrogen with minor amounts of $H_2O$, $CO_2$, and containing free carbon soot in the amount of about 0.01 to 3 weight percent (basis carbon in hydrocarbon fuel) is produced by non-catalytic partial oxidation of a hydrocarbon fuel with oxygen, preferably relatively pure oxygen (e.g., 95 mole $O_2$ or higher), optionally with steam, at an autogenous temperature in the range of 2000–3000° F. The atomic ratio of free (uncombined) oxygen to carbon in the feed (O/C ratio) is preferably in the range of about 0.80 to 1.5. The mole ratio ($CO/H_2$) in the effluent gas stream from the synthesis gas generator is generally in the range of about 0.56 when the hydrocarbon fuel to the generator is natural gas to about 1.2 when the fuel to the generator is vacuum residuum. The reaction time in the gas generator is about 2 to 6 seconds. The effluent gas stream from the synthesis gas generator is preferably relatively rich in CO.

Substanitally any low cost hydrocarbon fuel may be used as feed stock in this process which produces by means of partial oxidation a gas mixture comprising carbon monoxide and hydrogen in which the mole ratio $CO/H_2$ is greater than that desired for the subsequent synthesis process. For example, charge stock to a synthesis gas generator may include gaseous, liquid or solid hydrocarbonaceous fuels. Suitable gaseous fuels include natural gas, refinery off-gas, and by-product gas from the Fischer-Tropsch reaction.

Suitable liquid hydrocarbon fuels for feeding the synthesis gas generator cover the entire petroleum range from propane, naphthas and gas oils to heavy residual fuel oils, reduced crude oil, and whole crude. Also included are such hydrocarbon fuels as coal oil, shale oil and tar sand oil. Solid carbonaceous fuels, optionally in admixture with the aforesaid liquid hydrocarbon fuels, are also suitable, including such solid fuels as lignite, bituminous and anthracite coals, and petroleum coke.

The hydrocarbon fuel is partially oxidized in a refractory liner reaction zone of a free-flow synthesis gas generator at an autogenously maintained temperature within the range of about 2000 to 3000° F. and a pressure in the range of 1 to 350 atmospheres to produce a primary feed stream of synthesis gas. The synthesis gas generator preferably is a compact unpacked free-flow non-catalytic refractory-lined steel pressure vessel of the type described in U.S. Pat. 2,809,104 issued to D.M. Strasser et al. Preheating of the feed streams to the synthesis gas generator is optional, but generally desirable. For example, charging stocks of liquid hydrocarbon fuel and steam may be preheated to a temperature in the range of about 100 to 800° F. and the feed stream of oxygen may be preheated to a temperature in the range of about 100 to 750° F. The introduction of steam into the synthesis gas generator is opetional and is dependent upon the type of hydrocarbon fuel employed. For example, generally no steam is required with gaseous hydrocarbon fuels, about 0.1 to 1 part by weight of steam is used per part by weight of liquid hydrocarbon fuel, and about 0.5 to 2 parts by weight of steam is used per part by weight of solid carbonaceous fuel slurries.

The reaction zone for the non-catalytic water-gas direct shift reaction may comprise an unpacked free-flow steel pressure vessel lined with a refractory material and preferably free of obstructions and preferably of suitable size to provide a residence time in the range of about 0.1 to 5 seconds.

A stream of steam, preferably at a temperature in the range of about 500 to 1500° F., is mixed with hot effluent gas from said partial oxidation reaction zone and the mixture is introduced into a non-catalytic water-gas direct shift converter. While such premixing is preferred, alternatively, the steam may be fed separately to the shift converter and allowed to mix and react with the primary feed stream of synthesis gas separately introduced therein. The mixing, which cools the gas mixture, and the shift reaction, which heats the gas mixture, may take place concurrently. Although only one shift converter is illustrated, optionally a plurality of separate reactors may be employed.

The supplemental $H_2O$ supplied to the shift converter may be obtained from an external source or may be produced within the process.

The amount of supplemental $H_2O$ added to said primary feed gas mixture must satisfy heat and material balances. The equilibrium constant ($K_D$) for the water-gas direct shift reaction is shown in Equation I below. $K_D$ is a function of the reaction temperature and varies from 0.74 to 0.26 over a temperature range from 1700 to 2800° F.

$$K_D = \frac{(H_2) \times (CO_2)}{(CO) \times (H_2O)} \qquad (I)$$

where: $(H_2)$, $(CO_2)$, $(CO)$ and $(H_2O)$ represent the mole fractions (or partial pressures) of the constituent enclosed by the parenthesis and $\times$ represents a multiplying factor.

The water-gas shift feed stream is introduced into a non-catalytic free-flow adiabatic water-gas shift converter having a residence time in the range of about 0.1 to 5 seconds at a temperature of at least 1500° F. and preferably for about 0.1 to 2 seconds at a temperature in the range of about 1700 to 2800° F. and at a pressure in the range of about 1 to 350 atmospheres.

In the water-gas shift reaction, a portion of the $H_2O$ in the water-gas shift feed stream is reduced to hydrogen while simultaneously a stoichiometric amount of carbon monoxide is oxidized to carbon dioxide. The net result of the water-gas direct shift reaction is to decrease the mole ratio ($CO/H_2$) of the product gas leaving the water-gas direct shift converter.

An elevated temperature is maintained in the water-gas shift reaction zone such that the adiabatic water-gas direct shift reaction proceeds rapidly without a catalyst. The word "adiabatic" as used herein with respect to the water-gas shift reaction means that apart from minor unavoidable heat loss through the walls of the reactors, there is substantially no exchange of heat with the surroundings.

In a preferred embodiment of my invention, a primary feed stream of synthesis gas is introduced directly into said non-catalytic adiabatic water-gas direct shift conversion zone at substantially the conditions of temperature and pressure produced in the reaction zone of an unpacked free-flow non-catalytic partial oxidation synthesis gas generator at a temperature in the range of about 2000 to 2800° F. and a pressure in the range of about 1 to 350 atmospheres, which satisfies the heat requirements for the next step in the process, i.e., the non-catalytic adiabatic water-gas direct shift reaction. Thus the cost of heating and compressing gas is saved, providing a substantial economic advantage.

The gases leave the non-catalytic water-gas direct shift converter at a temperature in excess of 1500° F. and may be cooled in a cooling zone such as a waste heat boiler or direct water quench pot of conventional dip-leg quench design to a temperature in the range of about 400 to 800° F. The steam produced in the waste heat boiler may be used economically as all or a portion of the supplemental $H_2O$ supplied to the water-gas direct shift converter. Excess steam may be used elsewhere in the process or may be exported. For a detailed description of cooling synthesis gas by means of a waste heat boiler and a scrubbing tower, reference is made to U.S. Pat. 2,980,523, issued to R. M. Dille et al. A suitable dip-leg gas-liquid contacting apparatus is shown in U.S. Pat. 3,896,927, issued to R. E. Nagle et al.

Entrained free carbon soot may be scrubbed from the cooled shifted effluent gas leaving the waste heat boiler by direct contact with quench water in a gas-liquid contact apparatus, for example, a spray tower, venturi or jet contractor, bubble plate or packed column, or a combination of said equipment. Conventional venturi or jet contactors are described in Chemical Engineers Handbook, Fourth Edition, ed. by J. H. Perry, N.Y., McGraw-Hill Co., 1963, pages 18–55 to 56.

Excessive carbon dioxide may be removed from the product gas by a suitable conventional regenerative scrubbing process, e.g., monoethatnolamine, hot carbonate, or the Rectisol process. These processes may also remove any $H_2S$ which may be present in the product gas stream.

Methanol synthesis gas having a mole ratio ($CO/H_2$) of about 0.5 or lower and Fischer-Tropsch synthesis gas having a mole ratio ($CO/H_2$) in the range of about 0.5 to 1.0 may be made by the process of my invention, providing the effluent gas from the synthesis gas generator has a correspondingly higher $CO/H_2$ ratio than the desired product gas.

In another embodiment of my invention, a limited supplemental amount of free oxygen, preferably relatively pure oxygen (95 mole percent $O_2$ or higher), is introduced into the adiabatic non-catalytic water-gas direct shift conversion zone in an amount sufficient to maintain the temperature therein at least 1500° F. and preferably in the range of 1700 to 2800° F.

In still another embodiment of my invention, the water-gas shift feed stream is subjected to a plurality of and preferably two successive steps of water-gas direct shift reaction. The first water-gas shift reaction is performed in a non-catalytic adiabatic reactor, and the shifted gas is then subjected to further shifting in a second non-catalytic water-gas direct shift reactor in the manner previously described for the first shift reaction. Multi-shift operation is recommended for specific instances where a product gas with a desired composition cannot be easily made by the single shift process. Further, if the temperature of the water-gas shift feed gas is too low for the second non-catalytic shift reaction, a limited supplemental amount of free oxygen, preferably relatively pure oxygen (95 mole percent $O_2$ or higher), may be introduced into the second shift converter either directly or in admixture with supplemental steam. In such case, a portion of the $H_2$ and CO in the shift feed gas mixture reacts with said supplemental free-oxygen in the second non-catalytic water-gas direct shift conversion zone so as to raise the temperature in the second shift reaction zone to at least 1500° F. and preferably to a temperature in the range of 1700 to 2800° F.

DESCRIPTION OF THE DRAWING AND EXAMPLES

A more complete understanding of the invention may be had by reference to the accompanying schematic drawing which illustrates the process of this invention.

The following description of the drawing also serves as a specific example of the invention. Although the drawing and example illustrate a specific preferred embodiment of the process of this invention, it is not intended to limit the invention to the particular apparatus or materials described.

The drawing illustrates a specific example wherein the effluent stream of synthesis gas from a free-flow non-catalytic synthesis gas generator is reacted with a supplemental stream of steam in a non-catalytic adiabatic free-flow water-gas direct shift conversion zone to produce a stream of synthesis gas having a mole ratio ($CO/H_2$) that is lower than said effluent stream of synthesis gas from the gas generator.

EXAMPLE I

This example illustrates a preferred embodiment of the process of my invention as applied to the manufacture of methanol synthesis gas from a petroleum refinery off-gas.

With reference to the drawing, 616 moles per hour of refinery gas at a temperature of 1000° F. and a pressure of 500 pounds per square inch gauge (p.s.i.g.) and having the following composition are introduced into synthesis gas generator 1 by way of line 2 and burner 3:

|  | Mole percent |
| --- | --- |
| Methane | 95.8 |
| Ethane | 2.6 |
| Propane | 0.4 |
| Butane | 0.3 |
| Carbon dioxide | 0.3 |
| Nitrogen | 0.6 |

413 moles per hour of pure oxygen in a stream of 95 mole percent $O_2$ at a temperature of 300° F. and a pressure of 500 p.s.i.g. are introduced into gas generator 1 by way of line 4 and are reacted with said refinery gas in the refractory lined 5 reaction zone of gas generator 1. An effluent stream of synthesis gas is produced in gas generator 1 and leaves by way of line 6 having a temperature of about 2600° F., a pressure of about 450 p.s.i.g. a mole ratio $CO/H_2$ of 0.57, and the following composition as determined by standard methods of gas analysis:

|  | Mole percent |
| --- | --- |
| Carbon monoxide | 32.2 |
| Hydrogen | 56.4 |
| Carbon dioxide | 1.5 |
| Water | 9.1 |
| Methane | 0.4 |
| Argon | 0.1 |
| Nitrogen | 0.3 |

Also entrained in the effluent gas in line 6 is about 0.05 weight percent of free carbon soot (basis carbon in the refinery gas feed).

About 1879 moles per hour of the effluent stream of synthesis gas in line 6 at a temperature of about 2600° F. are mixed in line 7 externally from synthesis gas generator 1 with about 638 moles per hour of a supplemental stream of steam from line 8 at a temperature of 500° F. to form a water-gas shift feed gas mixture which is introduced directly into non-catalytic adiabatic direct water-gas shift converter 9 by way of line 10 at substantially the same pressure as that in said synthesis gas generator 1. The steam reacts with carbon monoxide in adiabatic water-gas direct shift converter 9 to produce additional hydrogen and carbon dioxide, and, then 2517 moles per hour of the shifted gas stream leave by way of line 11 at a temperature of about 2600° F. and at about 450 p.s.i.g. The shifted gas is then cooled to a temperature of about 575° F. in waste heat boiler 12 by indirect heat exchange with water entering through line 13 and leaving as steam through line 8. As previously described, the steam in line 8 is introduced into non-catalytic water-gas direct shift converter 9 in admixture with the primary feed stream from line 6.

The composition of the shifted product gas stream leaving non-catalytic direct shift converter 97 by way of line 11 follows:

|  | Mole percent |
| --- | --- |
| Carbon monoxide | 19.8 |
| Hydrogen | 46.5 |
| Carbon dioxide | 5.3 |
| Water | 27.9 |
| Methane | 0.2 |
| Argon | 0.1 |
| Nitrogen | 0.2 |

The mole ratio $CO/H_2$ of the shifted product gas stream in line 11 is 0.43 which is about 24.5 percent lower than the corresponding mole ratio of the effluent stream of synthesis gas in line 6. The product gas stream 14 may be used for methanol synthesis after removal of excess $CO_2$.

EXAMPLE II

This example describes another embodiment of the process of my invention as applied to the manufacture of methanol synthesis gas from a petroleum refinery vacuum tower residuum. It differs from Example I in that a supplementary stream of substantially pure oxygen, as shown by line 15 in the drawing, is introduced into non-catalytic water-gas shift converter 9 in admixture with the effluent gas from synthesis gas generator 1.

133.2 moles per hour of vacuum residuum at a temperature of 750° F. are reacted with 133.2 moles per hour of pure oxygen in a stream of 99 mole percent $O_2$ at a temperature of 300° F., and 116.5 moles per hour of steam at a temperature of 750° F. The Vacuum Residuum has an API gravity of 4.5°, a gross heating value of 17,500 b.t.u. per pound, and the following ultimate analysis in weight percent:

|  |  |
| --- | --- |
| Carbon | 85.8 |
| Hydrogen | 9.1 |
| Sulfur | 5.0 |
| Ash | 0.1 |

The partial oxidation of the liquid hydrocarbon fuel takes place in a refractory lined free-flow non-catalytic synthesis gas generator as previously described. The effluent gas leaves the reaction zone of the synthesis gas generator at a temperature of 2500° F. and a pressure of 500 p.s.i.g. The mole ratio $CO/H_2$ of this effluent gas is 1.17, and its composition is shown in Table I, following.

605 moles per hour of said effluent as from the synthesis gas generator at substantially the same pressure and temperature as produced are mixed with 501 moles per hour of steam at a temperature of 500° F. About 2 moles per hour of supplemental oxygen at a temperature of 300° F. are added and the resulting gas mixture is immediately introduced directly into a non-catalytic free-flow adiabatic water-gas direct shift converter. There the $H_2O$ in the gas stream reacts with the CO therein to produce additional $H_2$ and $CO_2$ and the added oxygen reacts exothermically with $H_2$, C or CO to keep the temperature in the zone above 1700° F. so that the water-gas direct shift conversion reaction may take place readily.

1106.1 moles per hour of shifted effluent gas leave the non-catalytic free-flow water-gas direct shift conversion zone at a temperature of 1750° F. and a pressure of 500 p.s.i.g. The effluent product gas has a mole ratio ($CO/H_2$) of 0.48, which is about 41 percent of the $CO/H_2$ mole ratio of the effluent gas from the synthesis gas generator. The composition of this gas stream is shown in Table I. This gas stream is introduced into a waste heat boiler where it is cooled to a temperature of about 600° F. by vaporizing 887 moles per hour of boiler feed water to saturated steam at a temperature of 500° F. and a pressure of 665 p.s.i.g. As previously described about 617 moles per hour of this saturated steam is recycled partially as feed to the synthesis gas generator, and also as feed to the non-catalytic shift conversion zone. About 270 moles per hour of this saturated steam remains available for other plant use.

TABLE I.—GAS ANALYSIS

| Composition, mole percent | Effluent gas from— | |
|---|---|---|
| | Synthesis gas generator | Non-catalytic direct shift conversion zone |
| CO | 45.6 | 14.6 |
| $H_2$ | 39.0 | 30.6 |
| $CO_2$ | 3.7 | 12.3 |
| $H_2O$ | 10.2 | 41.7 |
| $CH_4$ | 0.21 | 0.10 |
| A | 0.22 | 0.10 |
| $H_2S$ | 1.0 | 0.56 |
| COS | 0.07 | 0.04 |
| $CO/H_2$ | 1.2 | 0.48 |

EXAMPLE III

This example describes another embodiment of the process of my invention as applied to the manufacture of methanol synthesis gas from a petroleum refinery vacuum tower residuum (specified in Example II) and illustrates multi-shift non-catalytic adiabatic free-flow water-gas direct shift conversion.

605 moles per hour of effluent gas from the synthesis gas generator at substantially the same pressure and temperature as produced in Example II and having the composition shown in Table II, following, are mixed with 390 moles per hour of steam at a temperature of 500° F. The mixture is immediately introduced into a first non-catalytic free-flow adiabatic water-gas direct shift converter where the $H_2O$ in the gas stream reacts with the CO therein to produce additional $H_2$ and $CO_2$.

995.1 moles per hour of shifted effluent synthesis gas leave the first non-catalytic adiabatic water-gas direct shift converter at a temperature of 1750° F. and a pressure of about 500 p.s.i.g. This effluent gas has a mole ratio $CO/H_2$ of 0.54, which represents a 53.8 percent reduction of the $CO/H_2$ mole ratio of the effluent gas from the synthesis gas generator. The composition of this gas stream is shown in Table II, following.

111 moles per hour of supplemental steam at a temperature of 500° F., and about 2 moles per hour of supplemental oxygen at a temperature of 300° F. are mixed with said 995.1 moles per hour of shifted effluent gas. The gas mixture is directly introduced into a second non-catalytic adiabatic free-flow water-gas direct shift conversion zone where the added oxygen reacts exothermically with $H_2$, C or CO to keep the temperature in the second shift conversion zone above 1700° F. so that the water-gas direct shift conversion reaction may take place readily. Concurrently, the water-gas shift reaction takes place and more CO is converted to $CO_2$.

1106.1 moles per hour of effluent gas leave the second non-catalytic free-flow water-gas direct shift conversion zone at a temperature of 1750° F. and a pressure of 500 p.s.i.g. The effluent product gas has a mole ratio $(CO/H_2)$ of 0.48, which represents a 59 percent reduction of the $CO/H_2$ mole ratio of the effluent gas from the synthesis gas generator. The composition of this gas stream is shown in Table II. This gas stream is introduced into a waste heat boiler where it is cooled to a temperature of about 600° F. by vaporizing 887 moles per hour of boiler feed water to saturated steam at a temperature of 500° F. and a pressure of 665 p.s.i.g. As previously described about 617 moles per hour of this saturated steam is recycled partially as feed to the synthesis gas generator, and also as feed to the first and second non-catalytic adiabatic free-flow water-gas direct shift conversion zones. About 270 moles per hour of this saturated steam remains available for other plant use.

TABLE II.—GAS ANALYSIS

| Composition, mole percent | Effluent gas from— | | |
|---|---|---|---|
| | Synthesis gas generator | First non-catalytic direct shift conversion zone | Second non-catalytic shift conversion zone |
| CO | 45.6 | 18.1 | 14.6 |
| $H_2$ | 39.0 | 33.4 | 30.6 |
| $CO_2$ | 3.7 | 11.9 | 12.3 |
| $H_2O$ | 10.2 | 35.7 | 41.7 |
| $CH_4$ | 0.21 | 0.12 | 0.21 |
| A | 0.22 | 0.14 | 0.10 |
| $H_2S$ | 1.0 | 0.62 | 0.56 |
| COS | 0.07 | 0.04 | 0.04 |
| $CO/H_2$ | 1.2 | 0.54 | 0.48 |

The process of the invention has been described generally and by examples with reference to materials of particular compositions for purposes of clarity and illustration only. It will be apparent to those skilled in the art from the foregoing that various modifications of the process and materials disclosed herein can be made without departure from the spirit of the invention.

I claim:

1. In a process for the production of synthesis gas comprising a mixture of carbon monoxide and hydrogen which comprises forming a mixture of carbon monoxide and hydrogen relatively rich in CO by subjecting a hydrocarbon fuel to partial oxidation with free oxygen containing gas and optionally with a temperature moderator selected from the group consisting of $H_2O$, $CO_2$ and mixtures thereof in a gas generating zone producing a stream of effluent gas having a temperature in the range of about 2000 to 3000° F., and a pressure in the range of from 1 to 30 atmospheres, the improvement which comprises introducing said effluent gas at substantially the same conditions of temperature and pressure produced in said gas generating zone and a stream of supplemental $H_2O$ directly into a separate unpacked free-flow non-catalytic adiabatic water-gas shift conversion zone wherein said $H_2O$ is reacted with CO at a temperature of at least 1500° F. producing a synthesis gas mixture comprising CO, $H_2$, $H_2O$ and $CO_2$ and having a mole ratio $(CO/H_2)$ less than the mole ratio $(CO/H_2)$ of said effluent gas from said gas generating zone.

2. The process of claim 1 wherein the mole ratio $(CO/H_2)$ of the synthesis gas mixture is substantially that required for methanol synthesis.

3. The process of claim 1 with the added step of introducing supplemental oxygen into said non-catalytic adiabatic water-gas shift conversion zone in an amount sufficient to maintain the reaction temperature in said shift conversion zone at a temperature of at least 1700° F.

4. The process of claim 1 with the added step of introducing the synthesis gas mixture produced in said shift conversion zone into a waste heat boiler in indirect heat exchange with a stream of water so as to produce at least a portion of said stream of supplemental $H_2O$.

5. The process of claim 1 with the added steps of introducing said synthesis gas mixture produced in said separate unpacked non-catalytic adiabatic shift conversion zone and a stream of supplemental $H_2O$ directly into a second separate unpacked free-flow non-catalytic adiabatic water-gas shift conversion zone, wherein said $H_2O$ is reacted with CO at a temperature of at least 1500° F. producing a synthesis gas mixture comprising CO, $H_2$, $H_2O$ and CO and having a mole ratio $(CO/H_2)$ less than the mole ratio $(CO/H_2)$ of said effluent gas from the first non-catalytic adiabatic shift conversion zone.

6. The process of claim 5 with the added step of introducing supplemental oxygen into said second adiabatic non-catalytic water-gas shift conversion zone in an amount sufficient to maintain the reaction temperature in said second non-catalytic water-gas direct shift conversion zone at a temperature of at least 1700° F.

7. The process of claim 1 wherein the mole ratio ($CO/H_2$) of the synthesis gas mixture leaving the non-catalytic water-gas direct shift conversion zone is substantially that required for the Fischer Tropsch process.

8. In a process for the production of synthesis gas comprising a mixture of carbon monoxide and hydrogen which comprises forming a mixture of carbon monoxide and hydrogen relatively rich in CO by subjecting a hydrocarbon fuel to partial oxidation with free oxygen containing gas and optionally with a temperature moderator selected from the group consisting of $H_2O$, $CO_2$, and mixtures thereof in a gas generating zone producing a stream of effluent gas having a temperature in the range of about 2000 to 3000° F., and a pressure in the range of about 1 to 350 atmospheres, the improvement which comprises mixing together a stream of supplemental $H_2O$ and a stream of effluent gas from the generator at substantially the same conditions of temperature and pressure as produced in said gas generating zone to produce a process gas mixture having a temperature of at least 1500° F., and introducing said process gas mixture directly into a separate unpacked free-flow non-catalytic adiabatic water-gas shift conversion zone wherein said $H_2O$ is reacted with CO at a temperature of at least 1500° F. producing a synthesis gas mixture comprising CO, $H_2$, $H_2O$ and $CO_2$ and having a mole ratio ($CO/H_2$) less than the mole ratio ($CO/H_2$) of said effluent gas from said gas generating zone.

9. A continuous process for decreasing the mole ratio ($CO/H_2$) of a feed gas mixture comprising $H_2$, CO, $CO_2$ and $H_2O$ comprising mixing a stream comprising supplemental $H_2O$ with said feed gas mixture to produce a $H_2O$-enriched feed gas mixture at a temperature of at least 1500° F.; reacting together a portion of the $H_2O$ and a portion of the CO in said $H_2O$-enriched feed gas mixture without a catalyst at a reaction temperature of at least 1500° F. while said $H_2O$-enriched feed gas mixture is passing through a separate unpacked free-flow non-catalytic adiabatic water-gas direct shift conversion zone; and removing an effluent gas stream from said non-catalytic direct shift conversion zone comprising $H_2$, CO, $CO_2$ and $H_2O$ having a mole ratio ($CO/H_2$) which is less than the mole ratio ($CO/H_2$) of said feed gas mixture.

References Cited
UNITED STATES PATENTS

| | | | |
|---|---|---|---|
| 2,465,235 | 3/1949 | Kubicek | 252—373 |
| 2,618,611 | 11/1952 | Mayland | 252—373 |
| 3,490,872 | 1/1970 | Fenton | 23—213 |

LEON ZITVER, Primary Examiner

A. SIEGEL, Assistant Examiner

U.S. Cl. X.R.

23—260

PO-1050
(5/69)

UNITED STATES PATENT OFFICE
CERTIFICATE OF CORRECTION

Patent No. 3,723,345          Dated March 27, 1973

Inventor(s) BLAKE REYNOLDS

It is certified that error appears in the above-identified patent and that said Letters Patent are hereby corrected as shown below:

| | |
|---|---|
| Column 1, line 41 | "modeators" should read --moderators-- |
| Column 2, line 59 | "liner" should read --lined-- |
| Column 3, line 3 | "opetional" should read --optional-- |
| Column 4, line 22 | "3,896,927" should read --2,896,927-- |
| Claim 1, line 11 | "30" should read --350-- |

Signed and sealed this 20th day of November 1973.

(SEAL)
Attest:

EDWARD M.FLETCHER,JR.              RENE D. TEGTMEYER
Attesting Officer                  Acting Commissioner of Patents